United States Patent Office 3,255,248
Patented June 7, 1966

3,255,248
CATALYTIC HYDROGENATION OF ORGANIC NITROGENOUS CARBON COMPOUNDS TO AMINES
Hermann Suessenguth, Hermann Meier, and Hubert Corr, Ludwigshafen (Rhine), and Walter Simon, Neckargemuend, Germany, assignors to Badische Anilin- & Soda-Fabrik Aktiengesellschaft, Ludwigshafen (Rhine), Germany
No Drawing. Filed Dec. 18, 1962, Ser. No. 245,434
Claims priority, application Germany, Mar. 18, 1959,
B 52,521
16 Claims. (Cl. 260—563)

This invention relates to a process for the hydrogenation of nitrogenous carbon compounds. More specifically, it relates to a process for the hydrogenation of aromatic or non-aromatic nitrogenous carbon compounds the nitrogen atoms of which may be present in different groups. The invention further relates to the hydrogenation of such compounds in the presence of a special catalyst.

This application is a continuation-in-part of application Ser. No. 14,198, filed March 11, 1960, and now abandoned, the disclosure of which is incorporated herein by reference.

It is known that carbon compounds which contain nitro, nitroso, isonitroso, cyano or aryl nuclearly substituted amino groups may be hydrogenated by means of hydrogen at elevated temperature and at standard or increased pressure in the presence of sulfursensitive metals, such as copper, iron, cobalt and nickel. The catalysts are in general obtained by reduction of oxygen compounds of the said metals and used pressed, in powder form or applied to carriers. The activity of these catalysts is quite good but they have the disadvantage that their activity rapidly subsides so that they must soon be replaced or regenerated.

A further disadvantage of the said catalysts, especially when working in the liquid phase, resides in the fact that they are not stable mechanically.

Hydrogenation catalysts which contain sulfur and are therefore not sensitive to sulfur are also known, for example molybdenum sulfide. Although such catalysts give very good results in many hydrogenations, they are not suitable for the hydrogenation of nitrogenous carbon compounds because their activity then subsides very rapidly.

It is an object of the present invention to provide a process according to which nitrogenous carbon compounds can be hydrogenated for long periods of operation. It is another object of the invention to provide a process which can be carried out in the liquid phase without difficulty because the catalyst is sufficiently stable mechanically.

According to the present invention the said objects are achieved by hydrogenating the said nitrogenous carbon compounds in the presence of cobalt and/or nickel as catalyst, said catalyst having been sintered prior to the hydrogenation by heating the metals or their oxydes to a temperature of between about 1000° C. and about 20° C. below the melting point of the heated material.

Hydrogenation according to the new process is carried out at elevated temperature, under increased pressure, and in the liquid phase.

It is surprising that the catalysts to be used according to the present invention are at least as active as the above-described unsintered catalysts containing a sulfur-sensitive metal, although by reason of the sintering process their surface is appreciably less. It is also surprising that the life of these catalysts is a multiple of the life of the known catalysts.

Nitrogenous carbon compounds which contain a nitro, N-nitroso (>N—NO), isonitroso, cyano or an aryl nuclearly substituted amino group are preferred for hydrogenation according to the new process. It will be understood that the said nitrogenous carbon compounds may also contain more than one of the above-mentioned groups, for example 2 or 3. They may be identical or different. The preferred starting compounds otherwise have hydrocarbon structure with 1 to 12 carbon atoms or additionally contain an alkyl substituted amino group, a hydroxy group and/or an ether bridge, for example, in an alkoxy group with 1 to 4 carbon atoms. More particularly, preferred aliphatic nitriles have 2 to 10 carbon atoms, 1 or 2 nitrile groups and, apart from these, exhibit hydrocarbon structure or additionally contain an amino group, a hydroxy group and/or an ether bridge, for example, in an alkoxy group with 1 to 4 carbon atoms. Preferred arylamines have 6 to 10 carbon atoms and 1 to 2 amino groups contained in a hydrocarbon structure. Of the aromatic nitro compounds those are preferred which have 6 to 12 carbon atoms and 1 to 3 nitro groups and otherwise exhibit hydrocarbon structure. Nitroso amines having 2 hydrocarbon substituents with 1 to 8 carbon atoms each are also preferred. Finally, preferred isonitroso compounds include those oximes in which the isonitroso group is connected to a hydrocarbon structure with 3 to 8 carbon atoms. Suitable initial materials include nitrobenzene, m-dinitrobenzene, 1,3,5-trinitrobenzene, o- and p-nitrotoluene, dinitrotoluene, p,p'-dinitrodiphenyl, p-nitrochlorobenzene, m-nitrobenzaldehyde, nitrosobenzene, p-nitrosodimethylaniline, acetone oxime, methylethylketone, cyclohexanone oxime, cyclooctanone oxime, phenylacetaldoxime, methyl-phenylnitrosamine, dimethylnitrosamine, dipropylnitrosamine, benzyl cyanide, benzonitrile, isophthalic dinitrile, acetonitrile, amino-acetonitrile, β-hydroxypropionitrile, β-methoxypropionitrile, α-amino-propionitrile, acrylonitrile, isobutyronitrile, adipodinitrile, γ-cyanobutyric acid, aniline, p-phenylenediamine, the toluidines, p-nitraniline, m-nitraniline and naphthylamines.

The process is carried out at temperatures between about 40° and about 250° C. When compounds are hydrogenated which are unsaturated at the nitrogen atom, as a rule lower temperatures within the range mentioned above are used, whereas for hydrogenating aromatic ring systems more drastic conditions are needed as otherwise too long reaction periods are necessary. Initial materials unsaturated at the nitrogen atom are accordingly hydrogenated as a rule between 40° and 200° C., especially between 60° and 150° C. The hydrogenation of aromatic nitrogenous carbon compounds on the other hand is carried out at temperatures between 150° and 250° C., especially between 200° and 250° C.

It is obvious that nitrogenous carbon compounds having a group unsaturated at the nitrogen atom and having also an aromatic ring system may be hydrogenated in steps, the unsaturated nitrogen containing group being preferably hydrogenated at the said lower temperatures and both the unsaturated nitrogen containing group and the aromatic system being hydrogenated at the higher temperatures mentioned.

The process is carried out at a pressure above 20 atmospheres. The upper limit of the pressure range is not critical. For example, hydrogenation may be carried out at 600 atmospheres. The use of such high pressures does not bring any utility commensurate with the expense so that it is advantageous to work between 20 and 500 atmospheres, especially between 50 and 350 atmospheres.

The pressure and temperature are correlated so that a liquid phase is present in the reaction chamber.

As a rule, pure or technically pure hydrogen is used, but it is also possible to use gases rich in hydrogen, such as coke oven gas, watergas or town gas.

The expression "a catalyst which has been sintered" is intended to denote a catalyst which has been heated to a temperature too low to fuse the catalyst, but high enough to connect the particles, in order to diminish the surface and increase the mechanical strength. Cobalt and nickel may be used as catalyst. The catalysts may consist entirely of one of the said metals, but the metals can also be used in admixture with each other and/or applied to carrier substances. For example catalysts may be used which consist of cobalt and nickel on a carrier. The term "carrier" as used throughout the present specification means any substance being solid and inert under the conditions of the process. The carriers are as a rule inorganic compounds or mixtures of inorganic compounds which are not known to be hydrogenating catalysts under the conditions of the process and which do not affect the components in any other way. Suitable carriers are for example pumice, alumina, kieselguhr, natural or synthetic silicates, porcelain and quartz. It is preferred to use catalysts which do not contain more than 30% of an inert carrier.

It should be noted that a temperature of about 1000° C. represents a critical lower limit of the sintering temperature. As indicated by the word "about," it is difficult to accurately determine the temperatures prevailing under the sintering conditions. Thus the actual temperature may be 5 or 10° C. higher or lower than the measured temperature. If catalysts are sintered below the said critical limit, they exhibit an appreciable decrease in mechanical stability and surprisingly also have reduced periods of operation. Catalyst of especially good properties are those that have been sintered between about 1050° C. and a temperature about 20° C. below the melting point of the heated material. The advantages of the sintered catalysts are surprising in view of U.S. patent specification 2,941,954 where it is stated that catalysts, in particular cobalt catalysts, are rendered unsuitable for use when heated during regeneration to temperatures above 1775° to 1800° F. (968° to 982° C.).

The catalysts may be prepared, for example, by sintering the pulverulent metals, possibly in admixture with carrier substances, at temperatures which lie advantageously only slightly below the melting point of the metals concerned. Suitable sintering temperatures lie, for example, in the range between 20° and 100° C. below the melting point of the metal concerned. It is preferable to exclude oxygen during sintering or to reduce the catalyst prior to use.

Especially favorable results are achieved when starting from oxygen compounds of the said metals. The oxides or other oxygen compounds which are converted to the oxides at the latest at the sintering temperature, such as hydroxides, carbonates, nitrates, nitrites, formates, acetates and other organic salts, for example atmospheric oxygen, are heated. Suitable oxygen compounds include: cobaltous oxide, cobalt o-cobaltic oxide, nickelous oxide, nickel carbonate, cobaltous nitrite, nickelous acetate and cobaltous benzoate. The above-mentioned carrier substances may also be incorporated when using this method. In some cases it is recommendable to add promotors, such as alkali or alkaline earth compounds, titanium dioxide or compounds of metals of groups VB and VIB of the periodic system.

The sintering time depends on the temperature chosen and in general is at least half an hour, preferably 1 to 5 hours. The sintered oxides are then advantageously treated at temperatures between about 250° and about 600° C., preferably between about 350° and about 400° C., with hydrogen until the oxide has been practically completely reduced to metal. If the hydrogen treatment is carried out under elevated pressure, for example at 10 to 60 atmospheres, lower temperatures as for example 250° to 370° C., are in general necessary. In some cases it is advantageous to carry out the reduction in the reaction vessel in which the hydrogenation of the carbon compound is to be carried out, so that the catalyst does not come into contact with atmospheric oxygen.

To carry out the process according to this invention the compound to be hydrogenated is heated in the presence of hydrogen and the catalyst. Sometimes the coemployment of ammonia is recommendable. This is especially the case when hydrogenating compounds which are unsaturated at the nitrogen atom. The process is preferably carried out continuously. Since the catalysts have very good mechanical strength they are especially suitable when used in a method, in which the initial material, either alone or in admixture with a solvent such as water, tetrahydrofuran, ammonia, methanol or the reaction product formed, is trickled, together with hydrogen, down the catalyst which is rigidly arranged in a reaction tube. The high mechanical strength of the catalyst however also permits those methods where there is vigorous movement in the reaction chamber. In all cases the reaction mixture is preferably worked up by distillation.

The following examples will further illustrate this invention, but the invention is not restricted to these examples. The parts specified in the examples are parts by weight.

*Example 1*

Cobalt oxide powder is moistened with water and extruded to pellets having a diameter of 10 millimeters and the pellets are dried at 105° C. and heated with access of air for 3 hours at 1050° C. 840 parts of the sintered pellets is charged to a vertical pressure tube. The tube is heated to 400° C. and hydrogen passed through until no more water is formed. This requires about 48 hours.

105 parts of 45% aqueous aminoacetonitrile solution and 600 parts of liquid ammonia are mixed and the mixture is trickled together with hydrogen under a pressure of 280 atm. at 105° C. down the catalyst. Distillation of the reaction product gives 48 parts per hour of ethylenediamine, i.e., 95% of the theory. The catalyst has unchanged activity after operation for 400 hours.

*Example 2*

For the preparation of the catalyst, nickel oxide powder prepared by heating nickel hydroxide or nickel carbonate is made into a paste with water, the paste shaped to tablets 8 millimeters in diameter and the tablets dried at 110° C. and heated for 3 hours with access of air at 1050° C. 1080 parts of the sintered tablets is charged to a high-pressure tube and reduced by passing hydrogen at a pressure of 20 atm. thereover at 300° C. After about 50 hours, no more water is formed.

A mixture of 31 parts of aniline and 25 parts of the reaction product formed in the process is trickled per hour together with hydrogen at a pressure of 70 atm. down the catalyst at 210° C. 57 parts per hour of a mixture of cyclohexylamines is obtained by distillation. The product contains less than 1% of aniline.

The same result is obtained by shaping nickel acetate, made into a paste with water, in an extruder and further treating it as described above.

*Example 3*

Nickel oxide powder prepared by heating nickel nitrate is moistened with water and shaped to tablets of 6 millimeters diameter by means of a press. The tablets are dried at 105° C. and then heated for 2 hours in the presence of air at 1200° C. 1050 parts of the nickel oxide tablets thus obtained is charged into a high pressure tube and treated at 300° C. with hydrogen at a pressure of 25 atm. until no more water is formed.

A solution of 60 parts of dinitrotoluene in 600 parts of tetrahydrofuran together with hydrogen under a pressure of 300 atm. is trickled per hour down the catalyst heated to 140° C. 34 parts of toluylenediamine per hour is obtained by distilling the reaction mixture. This is a yield of 85% of the theory.

Example 4

80 parts of cobalt oxide powder obtained by calcination of cobalt carbonate, and 20 parts of fine aluminum oxide powder are mixed, the mixture is moistened with a little water and pellets 6 millimeters in diameter are extruded therefrom. The pellets are dried at 105° C. and then sintered for 3 hours at 1050° C. in the presence of air. 720 parts of the sintered pellets is charged to a vertical high pressure tube and reduced by leading hydrogen at normal pressure thereover at 350° C. The reduction is complete after 48 hours.

70 parts of a 40% aqueous solution of dimethylnitrosamine together with hydrogen under a pressure of 280 atmospheres is trickled down the catalyst per hour. The temperature is 90° C. 15 parts of dimethyl hydrazine, i.e., 66% of the theory, is obtained per hour by distilling the reaction mixture.

Similar results are obtained by hydrogenating at 70° C. and using a catalyst prepared from 60 parts of cobalt oxide powder, 10 parts of nickel oxide powder and 20 parts of fine aluminum oxide powder under the conditions described above.

Example 5

Down the catalyst described in Example 2 there are trickled at 140° C. per hour 100 parts of isonitrosopropane (or acetoxime) and 100 parts of liquid ammonia, together with hydrogen at a pressure of 180 atm. By distillation of the reaction mixture after removal of the ammonia there is obtained per hour 73 parts of isopropylamine, i.e., a yield of 90% of the theory.

Example 6

A mixture of 60 parts of n-butyronitrile and 500 parts of liquid ammonia is hydrogenated per hour continuously at a hydrogen pressure of 250 atm. and a temperature of 115° C. in the presence of the catalyst described in Example 1. By distillation 57 parts per hour of n-butylamine is obtained. This is a yield of 90% of the theory.

Example 7

A mixture of 36 parts of p-toluidine and 30 parts of the product formed in the reaction is hydrogenated per hour at 210° C. and a hydrogen pressure of 110 atm. in the presence of a catalyst prepared from nickel oxide as described in Example 2. 64 parts of a mixture of 4-methylcyclohexylamines which contains less than 1.5% of p-toluidine is obtained per hour. After operation for 550 hours, the catalyst exhibits unchanged activity.

The content of p-toluidine in the reaction product drops to below 1% when working at 230° C. under otherwise identical conditions.

Example 8

55 parts per hour of p-nitrotoluene in 440 parts of tetrahydrofuran is hydrogenated at 120° C. at a hydrogen pressure of 330 atm. in the presence of a catalyst prepared from nickel oxide as described in Example 3. By distillation, p-toluidine is obtained in an 82% yield. When working at 140° C., the yield is 83.5% of the theory.

Example 9

38 parts of dipropylnitrosamine, dissolved in 50 parts of methanol, is hydrogenated per hour at 70° C. and a hydrogen pressure of 230 atm. in the presence of the catalyst from cobalt oxide powder and aluminum oxide powder described in Example 4. N,N-dipropylhydrazine is obtained in a 62% yield. In analogous manner, N-methyl-N-phenylhydrazine may be obtained from methylphenylnitrosamine.

Example 10

Cyclohexanone oxime is hydrogenated at 135° C. and 240 atm. hydrogen pressure in the presence of the catalyst prepared from nickel oxide mentioned in Example 2. The throughput is 140 parts of cyclohexanone oxime per hour in admixture with 105 parts of liquid ammonia. The yield of cyclohexylamine is 87% of the theory. The catalyst exhibits unchanged activity after operation for 620 hours.

Example 11

Cobalt oxide powder is moistened with water and extruded to pellets having a diameter of 10 millimeters and the pellets are dried at 105° C. and heated with access of air for 3 hours at 1100° C. The sintered pellets are charged to a vertical pressure tube. The tube is heated to 400° C. and hydrogen passed through until no more water is formed. This requires about 48 hours.

500 parts of an 8% solution of isophthalodinitrile in m-xylylenediamine is passed per hour together with 300 parts of liquid ammonia and 4.5 parts of hydrogen over the catalyst thus prepared at a temperature of 105° C. and a pressure of 280 atm. After hydrogenation, nitrile groups are no longer detectable in the reaction product. The yield of newly formed m-xylylenediamine is 92.6%. After 6 months the catalyst is fully active and not disintegrated.

By varying the sintering temperature as indicated in the table, the following results are obtained:

| Sintering temperature | Yield | Catalyst life |
|---|---|---|
| 1,100° C | 92.6 | More than 6 months. |
| 1,050° C | 92.5 | Do. |
| 1,000° C | 92 | 10 weeks. |
| 950° C | 90.5 | 390 hours. |

Example 12

43 parts of ω-methoxypropionitrile, 350 parts of liquid ammonia and 50 l. of hydrogen are passed per hour at 95° C. and 300 atmospheres pressure over a cocatalyst prepared as described in Example 11. The methoxypropionitrile is completely reacted and methoxypropylamine is obtained in a 92.5% yield.

Example 13

35 parts of β-hydroxypropionitrile, 300 parts of liquid ammonia and 45 l. hydrogen are supplied per hour at 100° C. and 320 atmospheres pressure over a cocatalyst prepared as described in Example 11. The β-hydroxypropionitrile is completely reacted and 3-aminopropanol-(1) is obtained in a 93% yield.

We claim:

1. A process for the hydrogenation of a nitrogenously substituted hydrocarbon selected from the class consisting of
   (A) a hydrocarbon of 1 to 12 carbon atoms substituted solely by a nitrogenous radical selected from the group consisting of nitro, N-nitroso, isonitroso, cyano and aryl nuclearly substituted amino, and
   (B) a hydrocarbon of 1 to 12 carbon atoms substituted solely by said nitrogenous radical and by an additional substituent selected from the group consisting of hydroxy, alkoxy of 1 to 4 carbon atoms and alkyl substituted amino, which process comprises: preparing a sintered catalyst by heating a material selected from the class consisting of cobalt, nickel and the oxides of these metals to a temperature of at least 1000° C. to a temperature about 20° C. below the melting point of the heated material; and hydrogenating said nitrogenously substituted hydrocarbon in liquid phase at a temperature between 40° C. and 250° C., at a pressure between 20 and 500 atmospheres and in the presence of said sintered catalyst.

2. A process as claimed in claim 1 wherein said nitrogenously substituted hydrocarbon is an alkyl nitrile of 2 to 10 carbon atoms with from 1 to 2 nitrile groups.

3. A process as claimed in claim 1 wherein said nitrogenously substituted hydrocarbon is an alkyl nitrile in which the hydrocarbon structure consisting solely of carbon and hydrogen atoms is substituted solely by from 1 to 2 nitrile groups.

4. A process as claimed in claim 1 wherein said nitrogenously substituted hydrocarbon is an arylamine of 6 to 10 carbon atoms with from 1 to 2 amino groups substituted on the aryl nucleus.

5. A process as claimed in claim 1 wherein said nitrogenously substituted hydrocarbon is an aryl nitro compound of 6 to 12 carbon atoms with from 1 to 3 nitro groups substituted on the aryl nucleus.

6. A process as claimed in claim 1 wherein said nitrogenously substituted hydrocarbon is an N-nitroso amine substituted on the amino nitrogen atom by two hydrocarbon radicals of 1 to 8 carbon atoms each.

7. A process as claimed in claim 1 wherein said nitrogenously substituted hydrocarbon is an isonitroso compound in which the isonitroso group is substituted by a hydrocarbon radical of 1 to 8 carbon atoms.

8. A process as claimed in claim 1 wherein the sintering temperature is between about 1050° C. and a temperature about 20° C. below the melting point of the heated material.

9. A process as claimed in claim 1 wherein the metal employed as catalyst is cobalt.

10. A process as claimed in claim 1 wherein the metal employed as a catalyst is nickel.

11. A process as claimed in claim 1 wherein the metal catalyst is supported on an inert carrier.

12. A process as claimed in claim 1 wherein the hydrogenation is carried out at a temperature between 60° and 150° C. in order to hydrogenate unsaturated nitrogen atoms in the initial reactant.

13. A process as claimed in claim 1 wherein the hydrogenation is carried out at a temperature between 200° and 250° C. in order to hydrogenate unsaturated carbon atoms in the initial reactant.

14. A process as claimed in claim 1 wherein said metal catalyst has been prepared by sintering the corresponding metal oxide in the presence of oxygen at a temperature of from about 1000° C. to a temperature about 20° C. below the melting point of said metal oxide, and treating the sintered oxide with hydrogen at a temperature between about 250° and 600° C.

15. A process as claimed in claim 1, wherein the sintering temperature is between about 1050° C. and a temperature about 20° C. below the melting point of said metal oxide.

16. A process as claimed in claim 1 wherein said metal oxide is sintered in admixture with an inert carrier.

References Cited by the Examiner

UNITED STATES PATENTS

| | | | |
|---|---|---|---|
| 1,927,129 | 9/1933 | Lommel et al. | 260—563 X |
| 2,436,368 | 2/1948 | Weber et al. | |
| 2,499,847 | 3/1950 | Cass | 260—583 |
| 2,504,024 | 4/1950 | Howk et al. | 260—583 |
| 2,670,377 | 2/1954 | Thompson | 260—580 |
| 2,818,431 | 12/1957 | Beegle | 260—563 |
| 2,828,313 | 3/1958 | Scholz et al. | 260—563 X |
| 2,894,036 | 7/1959 | Graham | 260—580 |
| 2,974,169 | 3/1961 | Newby et al. | 260—580 X |
| 3,069,469 | 12/1962 | Wilkes | 260—570.9 |

CHARLES B. PARKER, *Primary Examiner.*

FLOYD D. HIGEL, *Assistant Examiner.*